No. 840,350. PATENTED JAN. 1, 1907.
A. LINDGREN.
PLOW.
APPLICATION FILED OCT. 16, 1906.
2 SHEETS—SHEET 2.
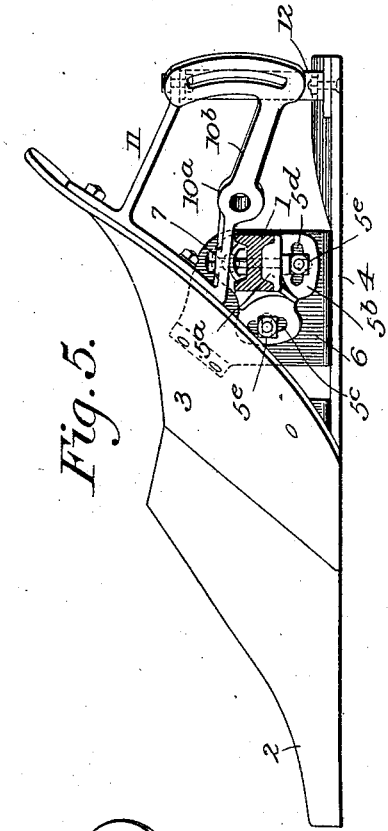
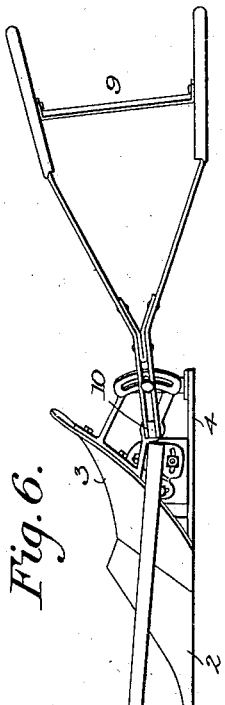
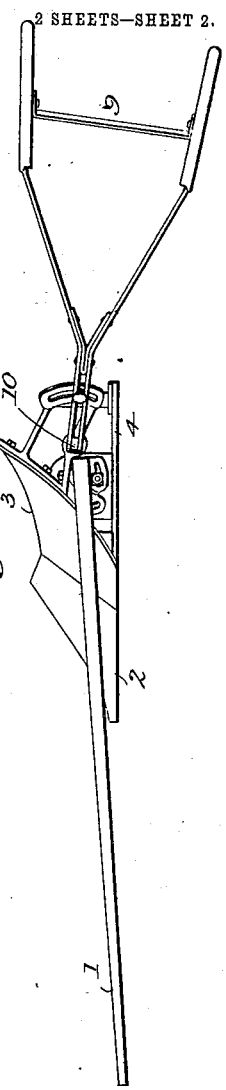
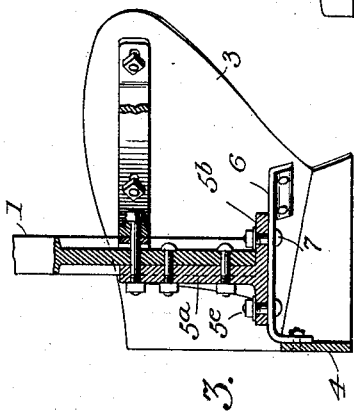
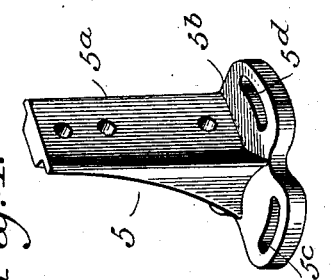
Witnesses
L. E. Morrison
C. W. Bundine
Inventor
August Lindgren
By P. T. Dodge Attorney

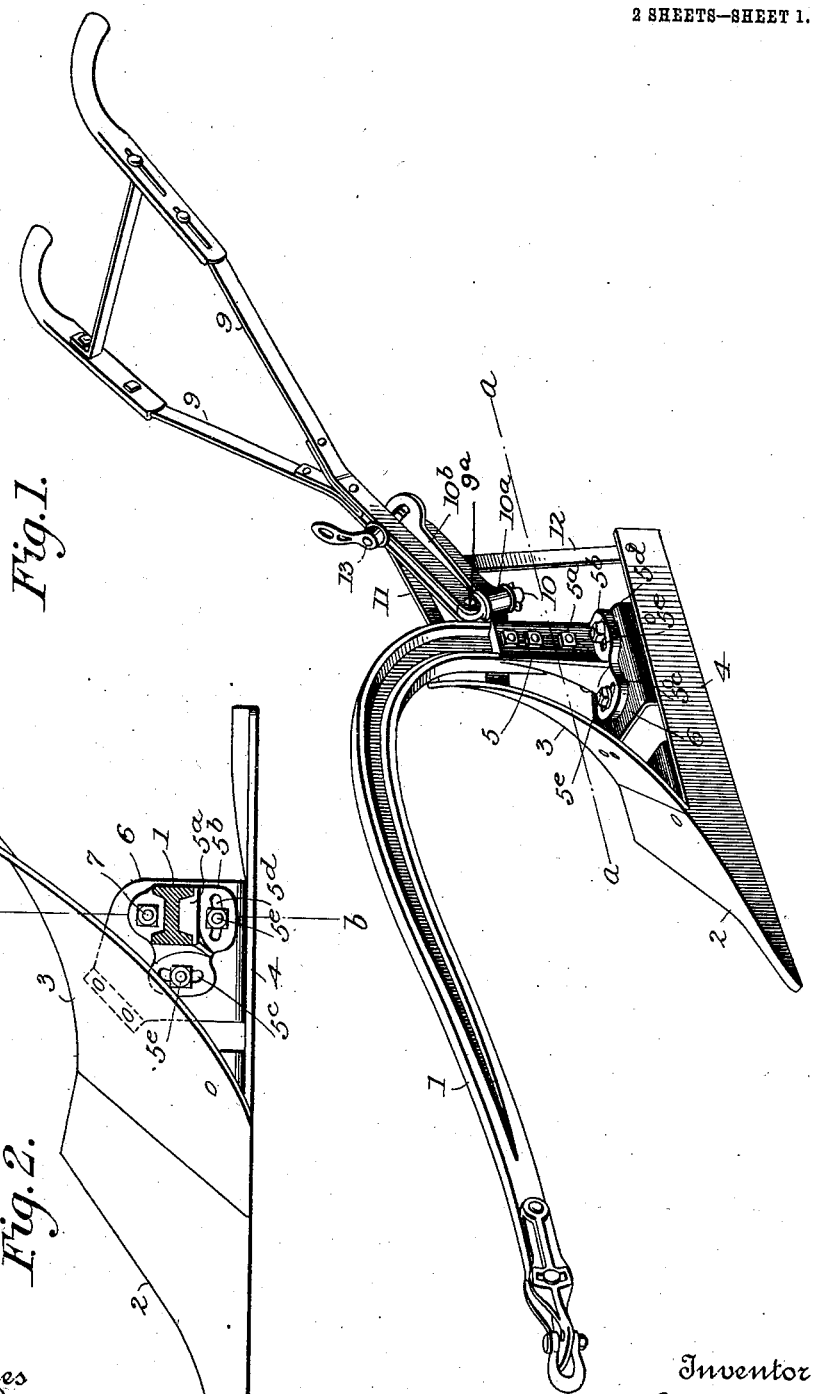

UNITED STATES PATENT OFFICE.

AUGUST LINDGREN, OF MOLINE, ILLINOIS, ASSIGNOR TO MOLINE PLOW COMPANY, A CORPORATION OF ILLINOIS.

PLOW.

No. 840,350.     Specification of Letters Patent.     Patented Jan. 1, 1907.

Application filed October 16, 1906. Serial No. 339,153.

*To all whom it may concern:*

Be it known that I, AUGUST LINDGREN, of Moline, county of Rock Island, and State of Illinois, have invented a new and useful Improvement in Plows, of which the following is a specification.

This invention relates to plows or cultivators designed more particularly for use in cultivating vineyards to throw the soil toward or away from the plants. In the use of the implement for this purpose it is very desirable to run the plow very close to the plants, especially while throwing the soil away, but in order to give the horse room to walk it is not possible to run the plow as close as desired.

It is the aim of my invention to overcome this difficulty; and the invention consists in improved means for adjusting the beam of the plow relatively to the landside and moldboard horizontally around a vertical axis, whereby the forward end of the beam, where the draft-animal is hitched, may be swung away from the plants, with the result that ample room will be given for the horse to walk and at the same time the plow may be run very close to the plants.

The invention consists also in improved means for effecting the adjustment of the handles, whereby the operator will also have room to walk when the plow is run close to the plants.

In the accompanying drawings, Figure 1 is a perspective view of a plow having my invention embodied therein. Fig. 2 is a horizontal sectional plan view, the section being taken on the line *a a* of Fig. 1. Fig. 3 is a vertical transverse section on the line *b b* of the preceding figure. Fig. 4 is a perspective view of a detail. Fig. 5 is a top plan view of the plow with parts in section. Fig. 6 is a diagrammatic view to illustrate the adjustment of the beam when the plow is used to throw the soil away from the plants. Fig. 7 is a similar view illustrating the adjustment of the beam when the plow is used to throw the soil toward the plants.

Referring to the drawings, 1 represents the beam, 2 the share, 3 the moldboard, and 4 the landside, which parts in themselves constitute no part of the present invention and may be, except in so far as hereinafter indicated, of the usual ordinary construction.

The beam extends downward vertically at its rear end and has firmly bolted to its side a casting or foot-piece 5 of the form illustrated more particularly in Fig. 4, which foot-piece comprises a vertical stem $5^a$, by means of which it is fastened to the side of the beam, and a horizontal flange $5^b$, forming a flat base, which is seated on and sustained by a horizontal plate 6, extending between and firmly secured to the inner side of the landside and plowshare. The base of the foot-piece at one side, preferably the furrow side of the plow, is pivoted to the plate 6, on a vertical axis, by means of a vertical pivot-pin 7, extending through the flange and plate, with the result that the beam and foot-piece attached to it may be swung around a vertical axis, so that the forward end of the beam may be adjusted horizontally to the right or left and set at an inclination with respect to the line of draft. In order to secure the beam in its adjusted position, the flange of the foot-piece is formed with curved slots $5^c$ and $5^d$, preferably at the front and side, which slots receive clamping-bolts $5^e$, extending upwardly through the plate 7 and by which means the foot-piece may be firmly clamped to the plate and held in its adjusted position.

It will be observed from the construction described that the beam is mounted back of the center of the moldboard a considerable distance from the landside, and it will also be observed that the relation of the pivoting-bolt 7 and the vertical portion of the beam is such that the latter is substantially coincident with the axis of the bolt. This enables the beam in its adjustment to swing free of interference with the adjacent parts of the plow.

In Fig. 6 is illustrated diagrammatically the adjustment of the beam to the right of the row of plants when the plow is used for throwing the soil away from the plants In Fig. 7 is illustrated diagrammatically the adjustment of the beam to the left when the plow is used to throw the soil toward the plants. In both cases the p ow may be run very close to the p ants and at the same time ample room be afforded the draft-animal without danger of injury to the plants In connection with the cultivation of plants under these conditions it is desirable also that means be provided for adjusting the handles away from the plants, so that the operator will also be given ample room to walk in guiding the plow. In carrying out this idea I adopt the construction shown, where it will be seen, referring particularly to Figs. 1 and 2, that the handles 9 converge at their forward ends, to which there is pivoted on a horizontal axis 9ª a vertical stud 10, mounted to journal in a vertical bearing formed in a bracket 10ª, situated in rear of the vertical portion of the beam and extending forwardly therefrom and bolted to the inner side of the moldboard. The bracket is extended rearwardly of the bearing in the form of an arm 10ᵇ, provided at its rear extremity with a transverse cross-head formed with curved transverse s ot therein, the purpose of which will presently appear. The cross-head is braced to the moldboard by means of a bar 11 connected to one end of the cross-head and extending forwardly and connected with the moldboard. The cross-head is further braced from the landside and sustained by means of a downwardly-extending brace-bar 12, connected with the cross-head at its upper end and at its lower end with the landside near the rear extremity of the latter.

The handles rest on and are sustained by the cross-head and pivot around a vertical axis represented by the stud, so that they may be swung to the right or left, as shown in Figs. 6 and 7. They are held in their adjusted positions by means of a clamping-bolt 13 sustained by the handles and extending through the transverse curved slots in the cross-head, the bolt being provided with a clamping-nut by which means the handles may be clamped firmly to the cross-head in the position to which they may be set. It will be manifest that the other forms of handles may be employed without departing from the limits of my invention with respect to the adjustment of the beam. While it is desirable that adjustable handles be employed in connection with an adjustable beam this is not absolutely essential, and my invention, as far as it relates to the adjustment of the beam, is independent in its functions and operations of the particular form of the handles. I prefer, however, to employ the form of handles represented.

Having thus described my invention what I claim is—

1 In a plow, the combination with a landside and moldboard, of a horizontal supporting-plate sustained fixedly with relation to and situated between said parts, a beam having at its rear extremity a downward extension, a horizontal flat base on the lower end of said extension seated on the horizontal plate, and means for adjusting the base on the plate around a vertical axis.

2 In a plow, the combination with a landside and moldboard, of a fixed horizontal supporting-plate situated between said parts, a beam provided at its rear end with a downward extension, a foot-piece fixed to said extension and formed with a flat base seated on the plate, and means for adjusting the foot-piece on the plate around a vertical axis 3. In a plow, the combination with a landside and moldboard and share, of a horizontal plate fixed to the landside and share, a horizontal beam having at its rear end a vertical downward extension, a foot-piece fixed to said extension and formed with a horizontal base or flange seated on the plate, a vertical pivot connecting the flange with the plate; whereby the foot-piece may be adjusted relatively to the plate around a vertical axis, and means for holding the parts in their adjusted positions.

4. In a plow, the combination with a landside and moldboard, of a horizontal beam adjustable horizontally around a vertical axis at or adjacent its rear end, a bracket sustained by the landside and moldboard, and handles sustained by said bracket and adjustable thereon around a vertical axis.

In testimony whereof I hereunto set my hand, this 21st day of September, 1906, in the presence of two attesting witnesses.

AUGUST LINDGREN.

Witnesses:
L. C. BLANDING,
N. C. SPAULDING.